United States Patent
Rahim (10) Patent No.: US 9,350,878 B2
(45) Date of Patent: May 24, 2016

(54) SYSTEM AND METHOD FOR REAL TIME RATING AND BILLING ACROSS DISTRIBUTED SITES WITH POOR LINK CONNECTIVITY

(71) Applicant: Redknee Inc., Mississauga (CA)

(72) Inventor: Rubens Rahim, North Vancouver (CA)

(73) Assignee: Redknee Inc., Mississauga (CA)

( * ) Notice: Subject to any disclaimer, the term of this patent is extended or adjusted under 35 U.S.C. 154(b) by 122 days.

(21) Appl. No.: 14/374,113

(22) PCT Filed: Jan. 23, 2013

(86) PCT No.: PCT/CA2013/000061
§ 371 (c)(1),
(2) Date: Jul. 23, 2014

(87) PCT Pub. No.: WO2013/110177
PCT Pub. Date: Aug. 1, 2013

(65) Prior Publication Data
US 2015/0004931 A1    Jan. 1, 2015

Related U.S. Application Data

(60) Provisional application No. 61/590,014, filed on Jan. 24, 2012.

(51) Int. Cl.
*H04M 15/00* (2006.01)
*H04W 4/24* (2009.01)
(Continued)

(52) U.S. Cl.
CPC .............. *H04M 15/59* (2013.01); *H04M 15/28* (2013.01); *H04M 15/31* (2013.01); *H04M 15/43* (2013.01);
(Continued)

(58) Field of Classification Search
CPC ...... H04M 15/59; H04M 15/28; H04M 15/31; H04M 15/43; H04M 15/74; H04M 15/80; H04M 15/835; H04M 15/8351; H04M 15/854; H04M 17/02; H04W 4/24
See application file for complete search history.

(56) References Cited

U.S. PATENT DOCUMENTS

| 8,897,746 B1 * | 11/2014 | Tarantino | H04M 15/28 |
| | | | 455/406 |
| 2007/0123211 A1 | 5/2007 | Lui et al. | |
| 2013/0132854 A1 * | 5/2013 | Raleigh | G06F 3/0482 |
| | | | 715/738 |

FOREIGN PATENT DOCUMENTS

| WO | 2005/050968 | 6/2005 |
| WO | 2010/088413 | 8/2010 |

OTHER PUBLICATIONS

International Search Report for corresponding International Application No. PCT/CA2013/000061, dated May 15, 2013.
(Continued)

*Primary Examiner* — Kashif Siddiqui
(74) *Attorney, Agent, or Firm* — Gardner, Linn, Burkhart & Flory, LLP (57) ABSTRACT

The present specification provides a system and method for real time rating and billing across distributed sites with poor link connectivity. The method includes receiving a request for initiate a connection with a mobile device; at a rating module, determining a rating associated with the connection request, based on (i) an identifier of the mobile device, and (ii) a quality of a link between the rating module and a billing engine; at a balance module connected to the rating module, determining whether a billing criterion associated with the connection request is satisfied, based on (i) an identifier of the mobile device, and (ii) a quality of a link between the balance module and the billing engine; and when the billing criterion is satisfied, sending a response to the request for completing the connection with the mobile device.

20 Claims, 4 Drawing Sheets (51) Int. Cl.
*H04M 15/28* (2006.01)
*H04M 17/02* (2006.01)

(52) U.S. Cl.
CPC .............. *H04M 15/74* (2013.01); *H04M 15/80* (2013.01); *H04M 15/8351* (2013.01); *H04M 15/854* (2013.01); *H04M 17/02* (2013.01); *H04W 4/24* (2013.01); *H04M 15/835* (2013.01)

(56) References Cited

OTHER PUBLICATIONS

European Search Report for corresponding European Application No. 13740631.0, dated Mar. 8, 2016.

\* cited by examiner

SYSTEM AND METHOD FOR REAL TIME RATING AND BILLING ACROSS DISTRIBUTED SITES WITH POOR LINK CONNECTIVITY

FIELD

The present specification relates generally to telecommunication systems and more specifically relates to telecommunication systems and methods for processing telecommunication rating and billing across distributed sites having poor link connectivity.

BACKGROUND

Real time rating and billing features are becoming well integrated into telecommunication infrastructures. However, poor link connectivity between various components of such telecommunication infrastructures seriously hinders the ability to provide of such features.

BRIEF DESCRIPTION OF THE DRAWINGS

Embodiments are described with reference to the following figures, in which.

DETAILED DESCRIPTION OF THE EMBODIMENTS

Figure 1:
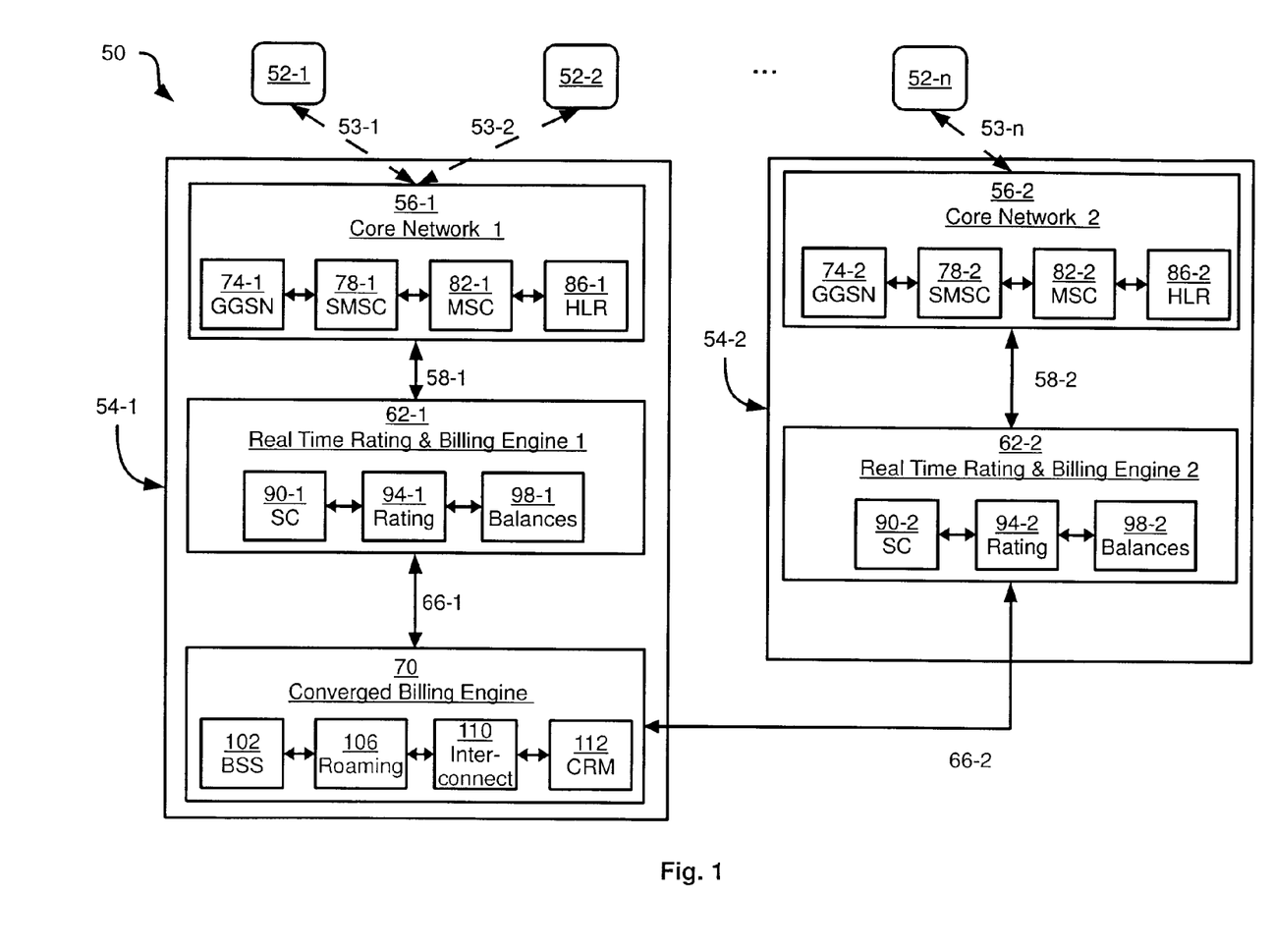
FIG. 1 is a schematic representation of a system for processing telecommunication rating and billing across distributed sites having poor link connectivity.

FIG. 1 a schematic representation of a non-limiting example of a system 50 for processing telecommunication rating and billing across distributed sites having poor link connectivity. System 50 comprises a plurality of communication devices 52-1, 52-2 . . . 52-n. (Generically, communication device 52, and collectively, communication devices 52. This nomenclature is used elsewhere herein.) Communication devices 52 are configured for wireless communication and can be based on, for example, cellular telephones, smart phones, tablet computers, laptop computers, notebook computers and the like.

Communication devices 52 are configured to connect to either a first telecommunication infrastructure 54-1 or to a second telecommunication infrastructure 54-2. (In variants, the teachings herein are scalable and contemplate more than two telecommunication infrastructures 54). For illustrative purposes, device 52-1 and device 52-2 are shown as connected via respective wireless links 53-1 and 53-2 to first telecommunication infrastructure 54-1, while device 52-n is shown as connected via a respective link 53-n to second telecommunication infrastructure 54-2. However, it is to be understood that different devices 52 can connect to different infrastructures 54 depending on the proximity of those devices 52 to different ones of infrastructures 54.

First telecommunication infrastructure 54-1 comprises a first core network 56-1 that connects, via a first link 58-1, to a first real time rating and billing engine 62-1 which in turn connects, via a second link 66-1, to a converged billing engine 70.

First core network 56-1 comprises the usual components for switching and connecting voice or data communications where at least one leg of such communications is occurring within that first core network 56-1. According to the illustrative example in FIG. 1, one leg of a communication can comprise a communication with either device 52-1 or device 52-2. First core network 56-1 thus includes, in a present non-limiting example, a network of one or more Gateway General Packet Radio Service (GPRS) Support Nodes (GGSN) 74-1, one or more Short Message Service Centers (SMSC) 78-1, one or more mobile switching centers (MSC) 82-1 and one or more home location registers (HLR) 86-1. Those skilled in the art will recognize that the example first core network 56-1 is based on the Global System for Mobile Communications (GSM) standard and, while they may not be shown in FIG. 1, that other components may be included. It will also be understood that first core network 56-1 may be based on other standards, or subsequent versions of GSM standards, or future standards, and thus the specific components within first core network 56-1 may be different though the functionality remains the same.

First real time rating and billing engine 62-1 comprises a service control (SC) module 90-1, a rating module 94-1, and a balances module 98-1. Service control module 90-1 is configured to interact with core network 54-1, including one or more of its respective components, in order to provide electronic instructions to first core network 56-1 advising whether to permit or deny or otherwise control the ability of devices 52 to communicate via first core network 56-1. Rating module 94-1 is configured to determine a billing rate to be applied to a given communication being conducted with a device 52 utilizing first core network 56-1. Indeed, billing rates can vary between devices 52, (or accounts associated with such devices 52) and can also vary between a particular type of service or application that is part of the communication. Billing rates can also vary for other reasons, such as time of day, week or month, and even these rates can vary between devices 52. Balances module 98-1 maintains a local cache of prepaid or postpaid balances in association with each device 52 that is utilizing core network 56-1, according to rates determined by rating module 94-1. Accordingly, the ability to provide real time rating can be very effective in increasing utilization of core network 54-1, in conjunction with likewise updating of balances in balances module 98-1 substantially in real time, particularly where a particular device 52 is on a prepaid model as opposed to a post paid model. (Though it is to be understood that the present teachings are also useful for postpaid models as real time billing information is available and can be used to inform whether or not access is granted by service control module 90-1.)

Converged billing engine 70 comprises a billing support system (BSS) 102 that manages final billing for both infrastructure 54-1 and infrastructure 54-2, as will be discussed further below. Billing support system 102 can also comprise a database that tracks all billing events for various devices 52. Converged billing engine 70 also comprises a roaming database 106 that identifies infrastructures that are external to each infrastructure 54. Furthermore, it is possible that system 50 can be configured so that each infrastructure 54 can be part of a single home network, in which cases devices 52 moving between each infrastructure 54 would not be considered to be roaming; conversely it is possible that system 50 can be configured so that each infrastructure 54 is its own, separate home network, and therefore movement of devices 52 between infrastructures 54 would be considered to be roaming. Roaming database 106 can be configured to handle either scenario. Converged billing engine 70 also comprises an interconnect module 110 that manages interconnections with second telecommunication infrastructure 54-2, as will be discussed further below. Converged billing engine 70 also comprises a customer resource management (CRM) module 112 that provides an interface for managing accounts associated with each device 52. Such an interface can allow, for example, a computing device operated by an administrator to connect to engine 70 and perform various operations on accounts associated with devices 52.

Second telecommunication infrastructure 54-2 comprises a second core network 56-2 that is functionally analogous to first core network 56-1, and can thus comprise substantially the same components as first core network 56-1, or variations thereon, in order to provide communication connectivity to devices 52 that connect with second core network 56-2. Thus, second infrastructure 54-2 includes a GGSN 74-2, an SMSC 78-2, an MSC 82-2 and an HLR 86-2.

Second telecommunication infrastructure 54-2 also comprises a second real time rating and billing engine 62-2 that is functionally analogous to first real time rating and billing engine 62-1, and can thus comprise substantially the same components as second real time rating and billing engine 62-2, or variations thereon. Thus, second engine 62-2 includes a service control module 90-2, a rating module 94-2, and a balances module 98-2.

Each of the components discussed above (that is, the components of core networks 56-1 and 56-2, the components of rating and billing engines 62-1 and 62-2 and the components of converged billing engine 70) can be implemented as one or more servers. Each such server includes memory, one or more communication interfaces and one or more processors. The processors are configured to execute instructions stored in the memory, which cause the processors to perform the functions mentioned above. Thus, the functions carried out in connection with the "blocks" described below are performed by the above-mentioned processors via the execution of computer-readable instructions. It will now be apparent to those skilled in the art that various data can also be stored in the memories of these servers, such as data representing balances in modules 98-1 and 98-2.

Of note is that second telecommunication infrastructure 54-2 does not include a converged billing engine analogous to billing engine 70. Instead, as will be discussed in further detail below, second telecommunication infrastructure 54-2 utilizes converged billing engine 70 via a link 66-2.

It is contemplated that link 58-1, link 58-2 and link 66-1 are good quality links in that they generally have good bandwidth and latency metrics (for example, bandwidth above a certain bandwidth threshold, and/or latency below a certain latency threshold), such that the real time functional objectives of their connected components are not substantially impacted by link quality. Link 66-2, on the other hand, is a poor quality link, having lower bandwidth or higher latency (or both) than link 66-1. For example, the bandwidth of link 66-2 may fall below the above-mentioned bandwidth threshold, and/or the latency may fall above the above-mentioned latency threshold. However, as a result of the novel and inventive teachings herein, the lower quality of link 66-2 does not impact the real time functional objectives of system 50. This aspect of the specification will be discussed further below.

Various real-world implementations for system 50 are possible. However, for greater understanding, one particular real-world implementation for system 50 can arise when first telecommunication infrastructure 54-1 is geographically distant from second telecommunication infrastructure 54-2, and where there is limited network connectivity between those geographic locations. In such circumstances, network connectivity for link 66-2 may only be satisfied through, for example, a satellite link. It is also contemplated that, as part of that real-world implementation it is possible, for example, that telecommunication infrastructure 54-2 may service a relatively small population such that the resources required to install and operate an independent billing engine 70 is not justified. It may still, however, be desirable to provide real time functionality to second telecommunication infrastructure 54-2, similar to that provided to first infrastructure by billing engine 70.

Figure 2:
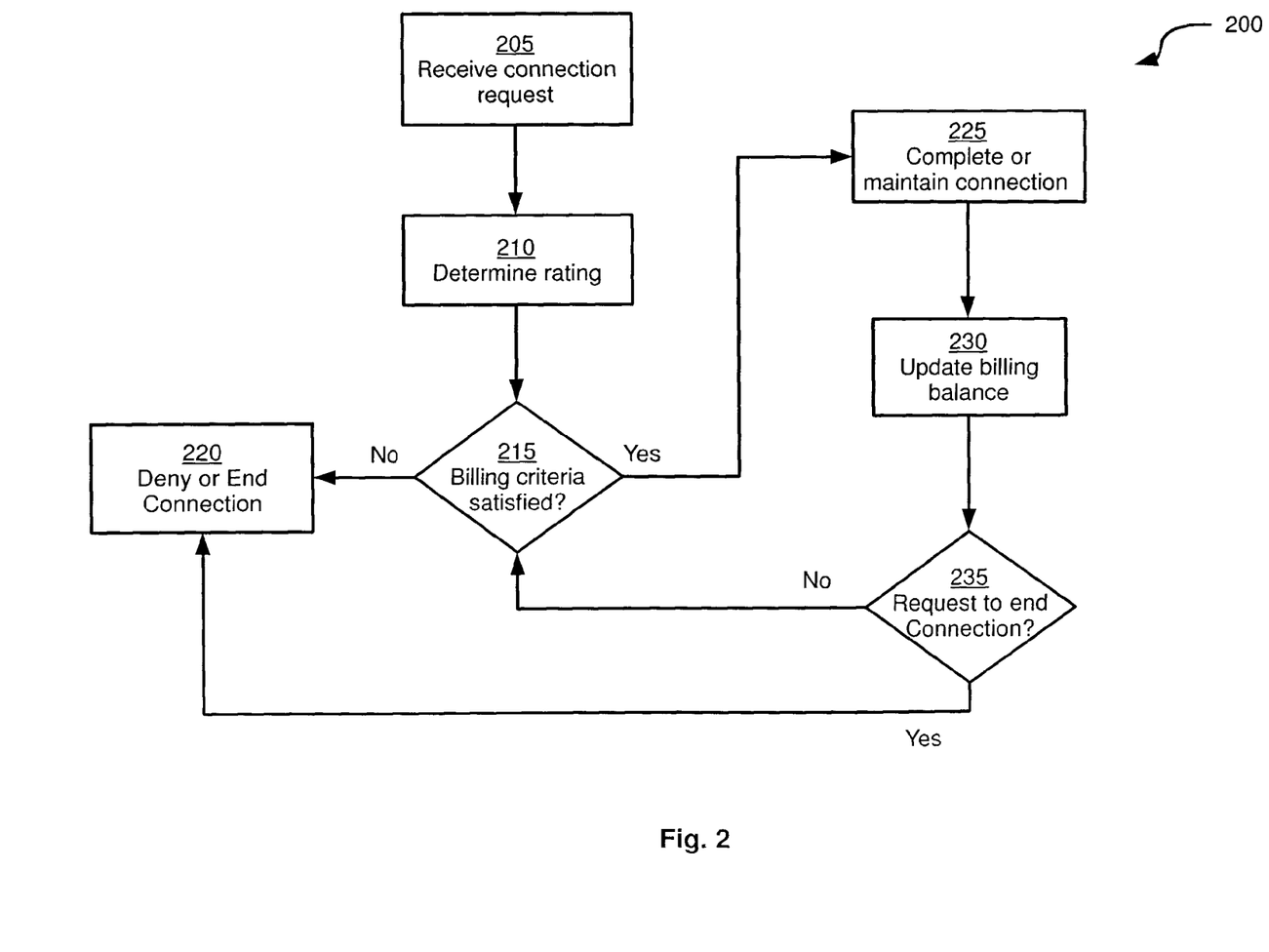
FIG. 2 is a flow chart depicting a method for processing telecommunication rating and billing across distributed sites having poor link connectivity.

Referring now to FIG. 2, a flowchart depicting a method for real time telecommunication rating and billing is indicated generally at 200. Method 200 is one way in which each infrastructure 54 can be configured to operate. Accordingly, the discussion of method 200 will refer to each infrastructure 54. It is to be emphasized, however, that method 200 and need not be performed in the exact sequence as shown; and likewise various blocks may be performed in parallel rather than in sequence; hence the elements of method 200 are referred to herein as "blocks" rather than "steps". It is also to be understood that method 200 can be implemented on variations of system 50.

Block 205 comprises receiving a connection request. A connection request can comprise any type of request to initiate any type of communication or service between a particular device 52 and a particular core network 56. The request can originate from a particular device 52 (e.g. an outbound telephone call, an outbound SMS message or an outbound Internet connection request) or can originate elsewhere and be a communication that is addressed to a particular device 52 (e.g. an inbound telephone call or an inbound SMS message).

To give a first illustrative example of performance of block 205 in relation to infrastructure 54-1, assume that device 52-1 initiates a telephone call over first core network 56-1. To give a second illustrative example of performance of block 205 in relation to infrastructure 54-2, assume that an incoming call is initiated to device 52-n.

Block 210 comprises determining a rating for the communication associated with the request from block 205. The performance of the rating determination at block 210 can vary according to the quality of link 66, as illustrated by method 300 in FIG. 3.

Figure 3:
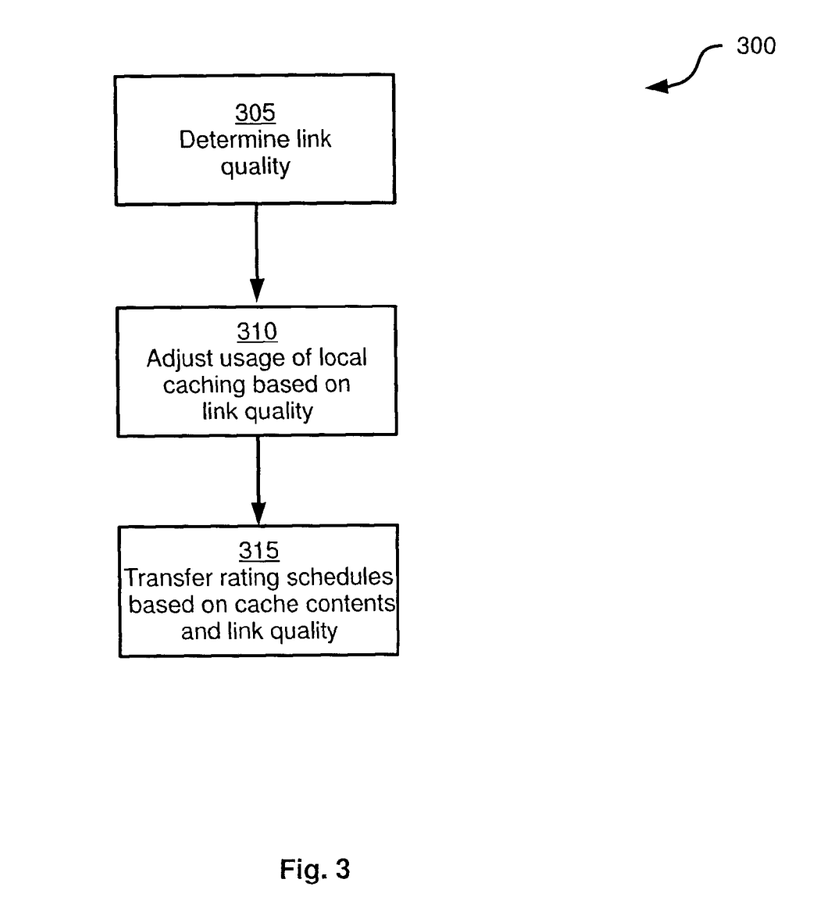
FIG. 3 is a flow chart depicting a method for updating rating schedules.

Referring now to FIG. 3, block 305 comprises determining the quality of the link; which in relation to system 50 is the quality of link 66. More generally, the link to be assessed at block 305 is the link between the rating and billing engine 62 and the converged billing engine 70. In the present example performance of method 300, therefore, at block 305 rating module 94-1 can be configured to determine the quality of link 66-1, for example by measuring or otherwise retrieving the bandwidth of link 66-1, the latency of link 66-1, or other parameters that will now occur to those skilled in the art. In some implementations, another component of engine 62-1 can determine link quality, and rating module 94-1 can retrieve that link quality from the other component.

Block 310 comprises adjusting the amount of local caching done based on the link quality; which in relation to system 50 is the amount of local caching done at rating module 94. More specifically, at block 310 rating module 94 is configured to determine to what extent locally cached rating schedules will be relied upon. For example, for link 66-1 (which is assumed to be of good quality), rating module 94-1 can be configured to reduce usage of locally cached data, since, as will be seen below, current data can be retrieved from engine 70. For link 66-2, on the other hand, rating module 94-2 can be configured to increase usage of locally cached data, as retrieving current data from engine 70 may be difficult or impossible.

Block 315 comprises transferring rating schedules based on the cache contents and link quality. For example, for method 300 in relation to infrastructure 54-1, where it is assumed that link 66-1 is of good quality, the determination at block 210 can involve an interaction between rating module 94-1 and billing support system 102 to ensure that, in relation to the device 52 associated with the request received at block 205, the current rating schedule for that device 52 and other information are substantially synchronized between rating module 94-1 and billing support system 102 via the performance of block 315. However, for method 300 in relation to infrastructure 54-2, where it is assumed for the purposes of the present discussion that link 66-2 is of poor quality, then block 210 can involve a purely local determination at rating module 94-2, with a synchronization between billing support system 102 and rating module 94-1 to be performed other times. That is, for low quality links, rating engine 94 can be configured to transfer little or no data at block 315, thus forgoing a real time synchronization with engine 70.

Continuing with the first illustrative example, the rating is performed by rating module 94-1, and thus the relevant components of core network 56-1 are configured to communicate with rating module 94-1 via link 58-1 to determine a rating for the type of communication and the device involved with block 205. Furthermore, as discussed above, since link 66-1 is of good quality, then in relation to the first illustrative example the rating determination at block 210 can also involve a real time synchronization or validation by rating module 94-1 that the locally stored rating at rating module 94-1 conforms with a master rating schedule maintained in billing support system 102. Thus, for the first illustrative example, assume that at block 210 it is determined that the relevant rate for the communication requested at block 205 is ten cents per minute.

Continuing with the second illustrative example, in which the request received at block 205 is received at infrastructure 54-2 (for example, at GGSN 74-2), the rating is performed by rating module 94-2, and thus the relevant components of core network 56-2 are configured to communicate with rating module 94-2 via link 58-2 to determine a rating for the type of communication and the device involved with block 205. As discussed above, since link 66-2 is of poor quality, then in relation to the second illustrative example the rating determination at block 210 will be based solely on the locally stored rating at rating module 94-2. Thus, for the second illustrative example, assume that at block 210 it is determined that the relevant rate for the communication requested at block 205 is fifteen cents per minute.

Referring again to FIG. 2, block 215 comprises determining if relevant billing criteria are satisfied. As part of the present specification, in some implementations block 215 contemplates that the determination process can vary according to the quality of link 66, as illustrated by method 400 in FIG. 4.

Figure 4:
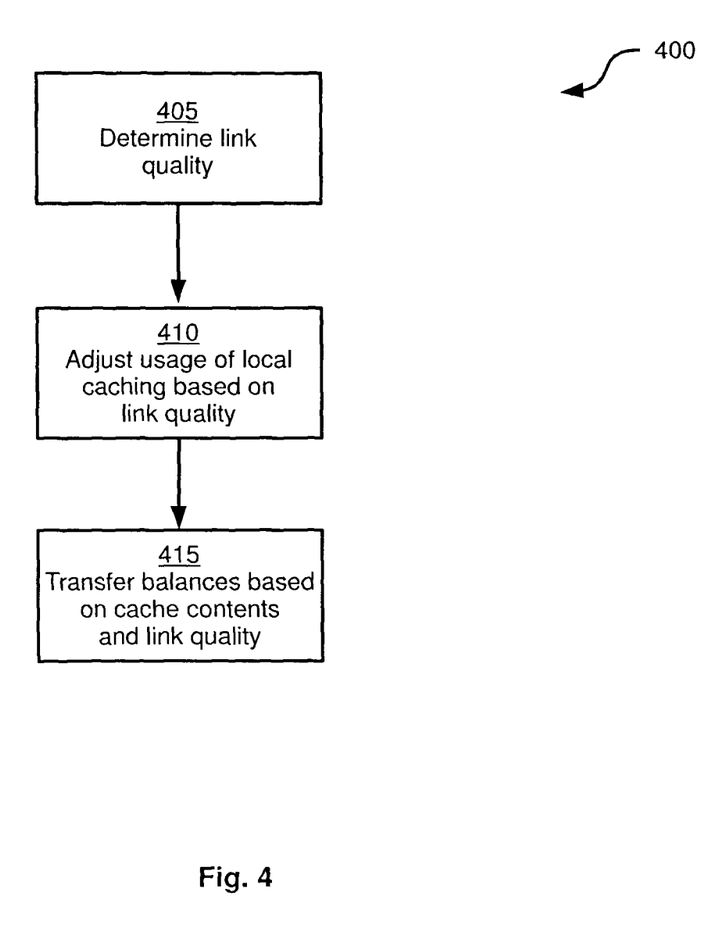
FIG. 4 is a flow chart depicting a method for updating billing balances.

Referring now to FIG. 4, at block 405 the quality of the link is determined; which in relation to system 50 is the quality of the relevant link 66. The determination of link quality can be performed by balance module 98, and can involve a new determination or the retrieval of results of the earlier determination by rating module 94. In other implementations, the determination can be performed by another element of engine 62, and provided to modules 94 and 98 as necessary.

Block 410 comprises adjusting the amount of local caching done based on the link quality; which in relation to system 50 is the amount of local caching done at balances module 98. As discussed above in connection with block 310, the adjustment at block 410 thus comprises a determination as to whether to rely on data cached locally at balances module 98, or to update that local data by synchronizing with engine 70 (specifically, with BSS 102).

Block 415 comprises transferring billing balances based on the cache contents and link quality. For example, for method 400 in relation to infrastructure 54-1, where it is generally assumed that link 66-1 is of good quality, then the determination at block 215 can involve an interaction between balances module 98-1 and billing subsystem 102 to ensure that, in relation to the device 52 associated with the request at block 205, the current billing balances and other information are substantially synchronized between balances module 98-1 and billing subsystem 102. However, in relation to infrastructure 54-2, where is generally assumed that link 66-2 is of poor quality, then block 215 can involve a purely local determination at balances module 98-2, with a synchronization between billing subsystem 102 and balances module 98-2 to be performed at another time.

Continuing with the first illustrative example for block 215, the billing criteria determination is performed by balances module 98-1, and thus the relevant components of core network 56-1 are configured to communicate with balances module 98-1 via link 58-1 and service control module 90-1 to determine whether billing criteria is satisfied such that the connection request should be fulfilled. In a prepaid context, the billing criteria can be based on whether there is a sufficient prepaid balance to support the connection request at the determined rate. In a postpaid context, the billing criteria can be based on whether the postpaid account is in good standing (e.g. has the most recent bill been timely-paid?) Furthermore, as discussed above, since link 66-1 is of good quality, then in relation to the first illustrative example the rating determination at block 210 can also involve a real time synchronization or validation by balances module 98-1 that the locally stored balance at balances module 98-1 conforms with a master rating schedule maintained in billing support system 102. Thus, for the first illustrative example, assume that at block 215 it is determined that a prepaid account is associated with device 52-1 and that there are sufficient funds, by way of a validation at both balances module 98-1 and billing support system 102, to proceed with the connection request.

Continuing with the second illustrative example for block 215, the billing criteria determination is performed by balances module 98-2, and thus the relevant components of core network 56-2 are configured to communicate with rating module 94-2 via link 58-2 and service control module 90-2 to determine whether billing criteria is satisfied such that the connection request should be fulfilled. In a prepaid context, the billing criteria can be based on whether there is a sufficient prepaid balance to support the connection request at the determined rate. In a postpaid context, the billing criteria can be based on whether the postpaid account is in good standing (e.g. has the most recent bill been paid?) As discussed above, since link 66-2 is of poor quality, then in relation to the second illustrative example the billing criteria at block 215 will be based solely on information locally stored at billing module 98-2. Thus, for the second illustrative example, assume that at block 215 it is determined that a postpaid account is associated with device 52-n and the most recent bill was paid, by way of a validation locally only at balances module 98-2, to proceed with the connection request.

A "no" determination at block 215 leads to block 220, at which point the original connection request is denied.

According to the first and second illustrative examples, however, "yes" determination is made for each.

Block 225 comprises completing the connection; or, if the connection was already in progress, then maintaining it. Block 225 is effected by service control module 90 sending an instruction to one or more relevant components in its respective core network 56 to continue with the communication connection.

Block 230 comprises updating the billing balance. As part of the present specification, in some implementations block 230 contemplates that the updating process can vary according to the quality of link 66, as illustrated by method 400 in FIG. 4. Block 405 comprises determining the quality of the link; which in relation to system 50 is the quality of links 66. Block 405 comprises adjusting the amount of local caching done based on the link quality; which in relation to system 50 is the amount of local caching done at billing modules 98. Block 415 comprises transferring billing balances based on the cache contents and link quality. For example, for method 400 in relation to infrastructure 54-1, where it is generally assumed that link 66-1 is of good quality, then the determination at block 230 can involve an interaction between billing module 98-1 and billing support system 102 to ensure that, in relation to the device 52 associated with the request at block 205, the current billing associated with the connection that is being maintained and block 225, (and at the rates determined at block 210), is substantially synchronized between billing module 98-1 and billing support system 102.

However, for method 400 in relation to infrastructure 54-2, where it is generally assumed that link 66-2 is of poor quality, then block 230 can involve a purely local determination of billing amounts which are maintained at balances module 230, with a synchronization between billing support system 102 and balances module 98-2 to be performed at other times. Those skilled in the art will also now appreciate that aggregate balance accumulations (or deductions) can be part of offline synchronizations at block 415 for any plurality of communications that are effected before such synchronizations take place, thereby further reducing straining on the resources of link 66-2.

Block 235 comprises determining if there is a request to terminate the connection. A "yes" determination leads to block 220, where the connection that was established at block 225 is terminated. A "no" determination leads back to block 215 (but could lead back to block 210) at which point the above discussion in relation to block 215, block 225 and block 230 applies again to this, and subsequent "no" determinations at block 235.

While various embodiments, implementations, and examples have been discussed, variations, combinations and subsets thereof are contemplated.

The specification provides a novel system and method for real time rating and billing across distributed sites with poor link connectivity. According to the specification, and advantageously, substantially real time rating and billing is achieved, while accommodating certain link resources of poor quality. Furthermore, a disaster recovery scheme is implicitly available even where certain link qualities are good. For example, even though link 66-1 is of good quality, should link 66-1 fail, network infrastructure 54-1 can continue to operate in a substantially real time manner, relying on locally cached rating and balance data rather than attempting to synchronize in real time with converged billing engine 70.

The invention claimed is:

1. A method for real time rating and billing, comprising:
    receiving a request to initiate a connection with a mobile device;
    at a rating module, determining a rating associated with the connection request, based on (i) an identifier of the mobile device, and (ii) a quality of a link between the rating module and a converged billing engine;
    at a balance module connected to the rating module, determining whether a billing criterion associated with the connection request is satisfied, based on (i) an identifier of the mobile device, and (ii) a quality of a link between the balance module and the converged billing engine; and
    when the billing criterion is satisfied, sending a response to the request for completing the connection with the mobile device.

2. The method of claim 1 wherein determining a quality of a link comprises retrieving one or more of a bandwidth of the link and a latency of the link.

3. The method of claim 2 wherein determining a quality of a link further comprises determining whether the one or more of the bandwidth and the latency meet predefined thresholds.

4. The method of claim 1 wherein determining a rating includes:
    when the quality of the link is determined to be low, determining the rating using a local rating schedule in a memory at the rating module; and
    when the quality of the link is determined to be high, determining the using a master rating schedule received over the link from the converged billing engine.

5. The method of claim 4, further comprising: when the quality of the link is determined to be high, storing the received master rating schedule in the memory as a local rating schedule.

6. The method of claim 1 wherein determining whether a billing criterion is satisfied includes:
    when the quality of the link is determined to be low, determining whether the billing criterion is satisfied using a local balance indicator in a memory at the balance module; and
    when the quality of the link is determined to be high, determining whether the billing criterion is satisfied using a master balance indicator received over the link from the billing converged engine.

7. The method of claim 6, further comprising:
    after completion of the connection, updating the local balance indicator in the balance module; and
    when the quality of the link is determined to be high, transmitting the updated local balance indicator to the converged billing engine via the link.

8. A system, comprising:
    a rating and billing engine for receiving a request to initiate a connection with a mobile device, the rating and billing engine including a rating module and a balance module; and
    a converged billing engine connected to the rating and billing engine via a link;
    the rating module configured to determine a rating associated with the connection request, based on (i) an identifier of the mobile device, and (ii) a quality of a link between the rating module and the converged billing engine;
    the balance module configured to determine whether a billing criterion associated with the connection request is satisfied, based on (i) an identifier of the mobile device, and (ii) a quality of a link between the balance module and the converged billing engine;
    the balance module further configured, when the billing criterion is satisfied, to send a response to the request for completing the connection with the mobile device.

9. The system of claim 8 wherein determining a quality of a link comprises retrieving one or more of a bandwidth of the link and a latency of the link.

10. The system of claim 9 wherein determining a quality of a link further comprises determining whether the one or more of the bandwidth and the latency meet predefined thresholds.

11. The system of claim 8 wherein determining a rating includes:
   when the quality of the link is determined to be low, determining the rating using a local rating schedule in a memory at the rating module; and
   when the quality of the link is determined to be high, determining the using a master rating schedule received over the link from the converged billing engine.

12. The system of claim 11, the rating module further configured to: when the quality of the link is determined to be high, store the received master rating schedule in the memory as a local rating schedule.

13. The system of claim 8 wherein determining whether a billing criterion is satisfied includes:
   when the quality of the link is determined to be low, determining whether the billing criterion is satisfied using a local balance indicator in a memory at the balance module; and
   when the quality of the link is determined to be high, determining whether the billing criterion is satisfied using a master balance indicator received over the link from the billing converged engine.

14. The system of claim 13, the balance module configured to:
   after completion of the connection, update the local balance indicator in the balance module; and
   when the quality of the link is determined to be high, transmit the updated local balance indicator to the converged billing engine via the link.

15. The method of claim 3 wherein determining a rating includes:
   when the quality of the link is determined to be low, determining the rating using a local rating schedule in a memory at the rating module; and
   when the quality of the link is determined to be high, determining the using a master rating schedule received over the link from the converged billing engine.

16. The method of claim 15, further comprising: when the quality of the link is determined to be high, storing the received master rating schedule in the memory as a local rating schedule.

17. The method of claim 16 wherein determining whether a billing criterion is satisfied includes:
   when the quality of the link is determined to be low, determining whether the billing criterion is satisfied using a local balance indicator in a memory at the balance module; and
   when the quality of the link is determined to be high, determining whether the billing criterion is satisfied using a master balance indicator received over the link from the billing converged engine.

18. The method of claim 17, further comprising:
   after completion of the connection, updating the local balance indicator in the balance module; and
   when the quality of the link is determined to be high, transmitting the updated local balance indicator to the converged billing engine via the link.

19. The system of claim 10 wherein determining a rating includes:
   when the quality of the link is determined to be low, determining the rating using a local rating schedule in a memory at the rating module; and
   when the quality of the link is determined to be high, determining the using a master rating schedule received over the link from the converged billing engine.

20. The system of claim 19, the rating module further configured to: when the quality of the link is determined to be high, store the received master rating schedule in the memory as a local rating schedule.

* * * * *